United States Patent
Goto et al.

(10) Patent No.: US 9,493,061 B2
(45) Date of Patent: Nov. 15, 2016

(54) GLASS RUN CHANNEL, GLASS RUN CHANNEL ASSEMBLY AND MANUFACTURING METHOD OF GLASS RUN CHANNEL

(75) Inventors: Yoshinori Goto, Aichi (JP); Kiyotaka Washino, Aichi (JP)

(73) Assignee: TOKAI KOGYO CO., LTD., Obu (JP)

(*) Notice: Subject to any disclaimer, the term of this patent is extended or adjusted under 35 U.S.C. 154(b) by 532 days.

(21) Appl. No.: 13/071,099

(22) Filed: Mar. 24, 2011

(65) Prior Publication Data
US 2011/0239410 A1    Oct. 6, 2011

(30) Foreign Application Priority Data

Apr. 1, 2010  (JP) .............................. P2010-084996
Dec. 28, 2010  (JP) .............................. P2010-293100

(51) Int. Cl.
| | |
|---|---|
| *E05D 15/16* | (2006.01) |
| *C08J 9/32* | (2006.01) |
| *C08J 9/36* | (2006.01) |
| *B29C 44/12* | (2006.01) |
| *B29C 44/22* | (2006.01) |
| *B29C 47/06* | (2006.01) |

(Continued)

(52) U.S. Cl.
CPC .............. *B60J 10/233* (2016.02); *B60J 10/15* (2016.02); *B60J 10/17* (2016.02); *B60J 10/74* (2016.02); *B60J 10/76* (2016.02); *Y10T 16/379* (2015.01)

(58) Field of Classification Search
CPC .................................................. B60J 10/0008
USPC ........... 269/93, 146.9; 49/441, 490.1, 498.1; 454/69; 264/51
See application file for complete search history.

(56) References Cited

U.S. PATENT DOCUMENTS 4,130,535 A * 12/1978 Coran et al. ................... 524/487
4,546,986 A * 10/1985 Roselli ................. B60J 10/0037
277/642

(Continued)

FOREIGN PATENT DOCUMENTS

| EP | 1 702 953 A2 | 9/2006 |
|---|---|---|
| EP | 1 849 638 A1 | 10/2007 |

(Continued)

OTHER PUBLICATIONS

Extended European Search Report issued in European Application No. 11159858.7 dated Dec. 13, 2012.
Author unknown, "Note on the use of rubbers and elastomers," pp. 54-55 and 86-87.

(Continued)

*Primary Examiner* — Gregory Huson
*Assistant Examiner* — Eric Gorman
(74) *Attorney, Agent, or Firm* — Oliff PLC

(57) ABSTRACT

A glass run channel having an elongated shape, which is mounted on a window frame of a vehicle door, guides moving up and down of a windowpane and is made of a polymer material, the glass run channel including a run channel main body that forms the main part of the glass run channel, the run channel main body including, a base bottom portion, an interior side wall portion, an exterior side wall portion, an interior seal lip and an exterior seal lip, wherein the run channel main body has a foamed part made of a foamable polymer material that includes a thermoplastic elastomer material and thermal expansion capsules, and has foaming cells which are formed by expansion of the thermal expansion capsules, and wherein a water absorption rate of the foamed part of the run channel main body is adjusted to 5% or less.

18 Claims, 5 Drawing Sheets

(51) Int. Cl.
- *B29C 47/12* (2006.01)
- *B60J 1/17* (2006.01)
- *B60J 5/04* (2006.01)
- *B60J 10/00* (2016.01)
- *B60J 10/04* (2006.01)

(56) References Cited

U.S. PATENT DOCUMENTS

| | | | |
|---|---|---|---|
| 4,603,899 A * | 8/1986 | Iwasa | B60J 10/24 296/154 |
| 4,789,703 A * | 12/1988 | Fabris | C08G 69/48 524/464 |
| 4,894,289 A * | 1/1990 | Otawa | B32B 25/08 428/122 |
| 4,969,294 A * | 11/1990 | Guillon | B60J 10/75 49/440 |
| 5,007,202 A * | 4/1991 | Guillon | B60J 10/0005 277/644 |
| 5,009,464 A * | 4/1991 | Hasegawa | B60J 7/022 296/213 |
| 5,183,613 A * | 2/1993 | Edwards | B29C 47/003 264/173.19 |
| 5,246,973 A * | 9/1993 | Nakamura et al. | 521/54 |
| 5,302,463 A * | 4/1994 | Murata | B32B 25/08 428/122 |
| 5,332,600 A * | 7/1994 | Iwasa | 427/393.5 |
| 5,343,609 A * | 9/1994 | McManus | B60J 10/235 264/177.17 |
| 5,396,733 A * | 3/1995 | Dupuy | 49/441 |
| 5,492,387 A * | 2/1996 | Yada | B29C 47/003 296/93 |
| 5,702,148 A * | 12/1997 | Vaughan et al. | 296/146.9 |
| 5,858,502 A * | 1/1999 | Tanaka | C08L 23/16 428/119 |
| 5,916,075 A * | 6/1999 | Tanaka | B60J 10/74 49/441 |
| 6,023,888 A * | 2/2000 | Dover | B60J 10/79 49/441 |
| 6,070,364 A * | 6/2000 | Berry | B60J 10/235 49/441 |
| 6,115,969 A * | 9/2000 | Nozaki | 49/479.1 |
| 6,146,739 A * | 11/2000 | Itoh | C08L 23/06 428/122 |
| 6,286,841 B1 * | 9/2001 | Foy | B29C 47/003 277/651 |
| 6,326,411 B1 * | 12/2001 | Desarzens et al. | 521/91 |
| 6,329,439 B1 * | 12/2001 | Peterson et al. | 521/51 |
| 6,368,700 B1 * | 4/2002 | Venkataswamy | B32B 27/08 428/195.1 |
| 6,433,090 B1 * | 8/2002 | Ellul et al. | 525/191 |
| 6,440,492 B1 * | 8/2002 | Coran | B60J 10/0008 427/195 |
| 6,451,411 B1 * | 9/2002 | Riley | E06B 7/16 428/156 |
| 6,864,315 B1 * | 3/2005 | Hakuta | C08K 5/0025 525/105 |
| 7,026,366 B2 * | 4/2006 | Sahnoune et al. | 521/142 |
| 7,316,097 B2 * | 1/2008 | Shiraiwa et al. | 49/441 |
| 7,906,560 B2 | 3/2011 | Nakahama et al. | |
| 8,205,391 B2 * | 6/2012 | Aritake et al. | 49/498.1 |
| 8,480,836 B2 * | 7/2013 | Orlych et al. | 156/244.14 |
| 2001/0015034 A1 * | 8/2001 | Omori | B60J 10/74 49/440 |
| 2002/0025405 A1 * | 2/2002 | Aritake | B29C 45/14467 428/122 |
| 2002/0183408 A1 * | 12/2002 | Sueda et al. | 521/59 |
| 2003/0004219 A1 * | 1/2003 | Sueda et al. | 521/142 |
| 2003/0008103 A1 * | 1/2003 | Sakuma | 428/122 |
| 2003/0035922 A1 * | 2/2003 | Yu | B29C 47/0004 428/122 |
| 2003/0205918 A1 * | 11/2003 | Carvalho | B60J 10/0005 296/203.03 |
| 2003/0220411 A1 | 11/2003 | Sakai et al. | |
| 2004/0001942 A1 * | 1/2004 | Sahnoune et al. | 428/304.4 |
| 2004/0224141 A1 * | 11/2004 | Seiling | 428/292.1 |
| 2005/0003158 A1 * | 1/2005 | Yamasa | B60J 10/0005 428/143 |
| 2005/0091935 A1 * | 5/2005 | Amano | B29C 45/14311 52/204.591 |
| 2005/0229495 A1 * | 10/2005 | Murase | B60J 10/21 49/428 |
| 2005/0242457 A1 * | 11/2005 | Seiling | 264/45.9 |
| 2006/0064936 A1 * | 3/2006 | Shiraiwa | B60J 10/16 49/441 |
| 2006/0065993 A1 * | 3/2006 | Stucky et al. | 264/51 |
| 2006/0086053 A1 * | 4/2006 | Ellis | B60J 10/0005 49/441 |
| 2006/0103045 A1 * | 5/2006 | O'Brien-Bernini et al. | 264/45.9 |
| 2006/0141208 A1 * | 6/2006 | Takase | C08L 23/16 428/122 |
| 2006/0226581 A1 * | 10/2006 | Kelly | B29C 53/083 264/492 |
| 2007/0006534 A1 * | 1/2007 | Hiramatsu | B60J 10/21 49/414 |
| 2007/0068085 A1 * | 3/2007 | Ninomiya | B60J 10/16 49/489.1 |
| 2007/0077375 A1 * | 4/2007 | Honda | B32B 5/14 428/31 |
| 2007/0084127 A1 * | 4/2007 | Muraoka et al. | 49/490.1 |
| 2007/0108648 A1 * | 5/2007 | Zanella | 264/45.1 |
| 2007/0122570 A1 * | 5/2007 | Honda | B32B 27/32 428/31 |
| 2007/0169417 A1 * | 7/2007 | Ellis | B29C 47/003 49/490.1 |
| 2007/0175101 A1 * | 8/2007 | Kanehara et al. | 49/441 |
| 2007/0249743 A1 * | 10/2007 | Sehanobish et al. | 521/134 |
| 2007/0251152 A1 * | 11/2007 | Takase et al. | 49/441 |
| 2007/0265364 A1 * | 11/2007 | Oner-Deliomanli et al. | 521/134 |
| 2007/0296250 A1 * | 12/2007 | Yatsuda | B60J 10/30 296/201 |
| 2008/0172948 A1 * | 7/2008 | Shibata | B60J 10/76 49/440 |
| 2009/0120007 A1 | 5/2009 | Aritake et al. | |
| 2009/0252969 A1 * | 10/2009 | Tamura | B29C 45/14311 428/409 |
| 2009/0277095 A1 * | 11/2009 | Honda | E06B 7/2314 49/475.1 |
| 2009/0278379 A1 * | 11/2009 | Tamura | 296/146.2 |
| 2010/0011671 A1 * | 1/2010 | Gentemann | B60J 10/041 49/489.1 |
| 2010/0021715 A1 * | 1/2010 | Kondo | 428/310.5 |
| 2010/0199568 A1 * | 8/2010 | Kondo | B60J 10/042 49/441 |
| 2010/0222479 A1 * | 9/2010 | Honda | B60J 10/17 524/261 |
| 2011/0021650 A1 * | 1/2011 | Itadani et al. | 521/79 |
| 2011/0109009 A1 * | 5/2011 | Guellec | B60J 10/044 264/252 |
| 2011/0197472 A1 * | 8/2011 | Yamada | 36/88 |
| 2012/0247026 A1 * | 10/2012 | Sato | B60R 13/04 49/493.1 |
| 2013/0074417 A1 * | 3/2013 | Kawai | B60J 10/85 49/490.1 |
| 2013/0111821 A1 * | 5/2013 | Suzuki | B60J 10/78 49/483.1 |
| 2013/0340348 A1 * | 12/2013 | Matsuura | B60J 10/0054 49/442 |
| 2014/0196252 A1 * | 7/2014 | Sakai | E05F 1/002 16/71 |
| 2014/0246878 A1 * | 9/2014 | Shimizu | B60J 5/0402 296/146.2 |
| 2015/0047264 A1 * | 2/2015 | Kobayashi | B60J 10/042 49/440 |
| 2016/0214471 A1 * | 7/2016 | Bessho | B60J 10/76 |

FOREIGN PATENT DOCUMENTS

| | | |
|---|---|---|
| JP | A-06-183305 | 7/1994 |
| JP | A-11-043551 | 2/1999 |
| JP | A-2001-206069 | 7/2001 |
| JP | A-2003-192853 | 7/2003 |

(56) References Cited

FOREIGN PATENT DOCUMENTS

| | | |
|---|---|---|
| JP | A-2003-268148 | 9/2003 |
| JP | 2005088718 A | 4/2005 |
| JP | A-2005-133090 | 5/2005 |
| JP | A-2005-220273 | 8/2005 |
| JP | 2006274212 A | 10/2006 |
| JP | A-2007-186559 | 7/2007 |
| JP | A-2009-120048 | 6/2009 |
| JP | 2011-178199 A | 9/2011 |
| KR | 20090117623 A | 11/2009 |
| WO | WO 2004/108401 A2 | 12/2004 |

OTHER PUBLICATIONS

Author unknown, "Encyclopedia of Polymer Materials," pp. 195 and 205-206.

Oct. 14, 2014 Office Action issued in Japanese Application No. 2010-293100 (with translation).

Jun. 30, 2015 Office Action issued in Japanese Patent Application No. 2010-293100.

Nov. 25, 2014 Office Action issued in Japanese Application No. 2010-293100.

Jan. 14, 2015 Office Action issued in Korean Application No. 10-2011-0027006.

* cited by examiner

GLASS RUN CHANNEL, GLASS RUN CHANNEL ASSEMBLY AND MANUFACTURING METHOD OF GLASS RUN CHANNEL

CROSS-REFERENCE TO RELATED APPLICATIONS

This application claims priority from Japanese Patent Application No. 2010-084996 filed on Apr. 1, 2010, and from Japanese Patent Application No. 2010-293100 filed on Dec. 28, 2010, the entire contents of which are incorporated herein by reference.

TECHNICAL FIELD

The present invention relates to a glass run channel, a grass run channel assembly and a manufacturing method of a glass run channel.

BACKGROUND

For example, a glass run channel, which is mounted on a run mounting portion of a window frame that is provided along a window opening edge of a front door or a rear door of a vehicle and which guides moving up and down of a windowpane, is made of a rubber material or a polymer material (a thermoplastic elastomer material).

Further, a glass run channel, which is constituted of a foaming body that has countless foaming cells so as to achieve a reduction in weight of the glass run channel, is known.

Related-art discloses a glass run channel, in which microcapsules (thermal expansion capsules) are mixed with the rubber material, foamed and expanded.

Further, related-art discloses a glass run channel in which a chemical foaming agent is mixed to the polymer material, foamed and expanded.

In the related-art glass run channel made of foaming rubber, it is difficult to reduce the specific gravity and reduce the weight compared to the related-art glass run channel made of foamable polymer (made of thermoplastic elastomer).

Further, in the glass run channel made of foamable polymer, the chemical foaming agent is mixed with the polymer material, whereby expansion occurs. Thus, the countless foaming cells easily become opened cells that communicate with each other, and fluid, such as water, is easily absorbed.

Accordingly, after the polymer material that is mixed with the chemical foaming agent is extruded from an outlet of a mold of the extrusion molding machine and the molding body having a shape corresponding to the cross-sectional shape of the glass run channel is formed, when the molding body is, for example, cooled and solidified by coolant water in manufacturing the glass run channel, the glass run channel absorbs the coolant water.

Thus, after the glass run channel is cooled and solidified, a drying process is required so as to vaporize fluid that is absorbed within the glass run channel.

The glass run channel absorbs the fluid even in a use state in which the glass run channel is mounted on the run mounting portion of the window frame of the front door or the rear door. Thus, when outdoor temperature is a low temperature, fluid within the glass run channel is frozen and the glass run channel is excessively hardened so that there is a possibility that abnormal noise will be generated when the windowpane is moved up and down.

SUMMARY

Accordingly, an object of the invention is to provide a glass run channel which can be lightweight and suppress the absorption of fluid, a glass run channel assembly using the glass run channel, and a manufacturing method of the glass run channel.

According to an aspect of the invention, there is provided a glass run channel having an elongated shape, which is mounted on a run mounting portion of a window frame of a vehicle door, guides moving up and down of a windowpane and is made of a polymer material, the glass run channel comprising: a run channel main body that forms the main part of the glass run channel, the run channel main body including, a base bottom portion which is provided at a position facing an end surface of the windowpane; an interior side wall portion which extends from a width end of the base bottom portion, an exterior side wall portion which extends from another width end of the base bottom portion, an interior seal lip, which projects toward the base bottom portion from an opening side end of the interior side wall portion and elastically contacts a first surface of the windowpane, and an exterior seal lip, which projects toward the base bottom portion from an opening side end of the exterior side wall portion and elastically contacts a second surface of the windowpane, wherein the run channel main body has a foamed part made of a foamable polymer material that includes a thermoplastic elastomer material and thermal expansion capsules, and has foaming cells which are formed by expansion of the thermal expansion capsules, and wherein a water absorption rate of the foamed part of the run channel main body is adjusted to 5% or less.

According to another aspect of the present invention, there is provided a glass run channel assembly including at least two above-described glass run channels, wherein the at least two glass run channels are joined and constituted in an integrally continuous shape to each other by a connecting body.

According to another aspect of the invention, there is provided a method of manufacturing the above-described glass run channel, the method comprising: inputting a thermoplastic elastomer material and a masterbatch material into a extrusion molding machine in an adjusted weight ratio, wherein the masterbatch material is formed by mixing the thermal expansion capsules with the thermoplastic resin material, the thermoplastic resin material being the same material as the thermoplastic elastomer material or being miscible with the thermoplastic elastomer material, providing a foamable polymer material by heating and pressurizing each material while mixing in the extrusion molding machine; supplying the foamable polymer material to a mold extruding the foamable polymer material from an outlet of the mold of the extrusion molding machine after supplying the foamable polymer material to the mold; forming a molding body of a shape corresponding to a cross-sectional shape of the glass run channel by expanding and foaming the thermal expansion capsules immediately after the extrusion; and cooling and solidifying the molding body after the foaming.

According to another aspect of the present invention, there is provided a glass run channel having an elongated shape, which is mounted on a run mounting portion of a window frame of a vehicle door, guides moving up and down of a windowpane and is made of a polymer material, the glass run channel comprising: a run channel main body that forms the main part of the glass run channel, the run channel main body including, a base bottom portion which is provided at a position facing an end surface of the windowpane; an interior side wall portion which extends from a width end of the base bottom portion, an exterior side wall portion which extends from another width end of the base bottom portion, an interior seal lip, which projects toward the base bottom portion from an opening side end of the interior side wall portion and elastically contacts a first surface of the windowpane, and an exterior seal lip, which projects toward the base bottom portion from an opening side end of the exterior side wall portion and elastically contacts a second surface of the windowpane, wherein the base bottom portion, the interior side wall portion, the exterior side wall portion and the interior seal lip portion are made of a foamable polymer material that includes a thermoplastic elastomer material and thermal expansion capsules, and has foaming cells which are formed by expansion of the thermal expansion capsules, and wherein each water absorption rate of the base bottom portion, the interior side wall portion, the exterior side wall portion and the interior seal lip portion is adjusted to 5% or less.

DETAILED DESCRIPTION

The first exemplary embodiment embodying a mode for carrying out the invention will be described.

The first exemplary embodiment of the invention will be described with reference to FIGS. 1 to 3.

Figure 1:
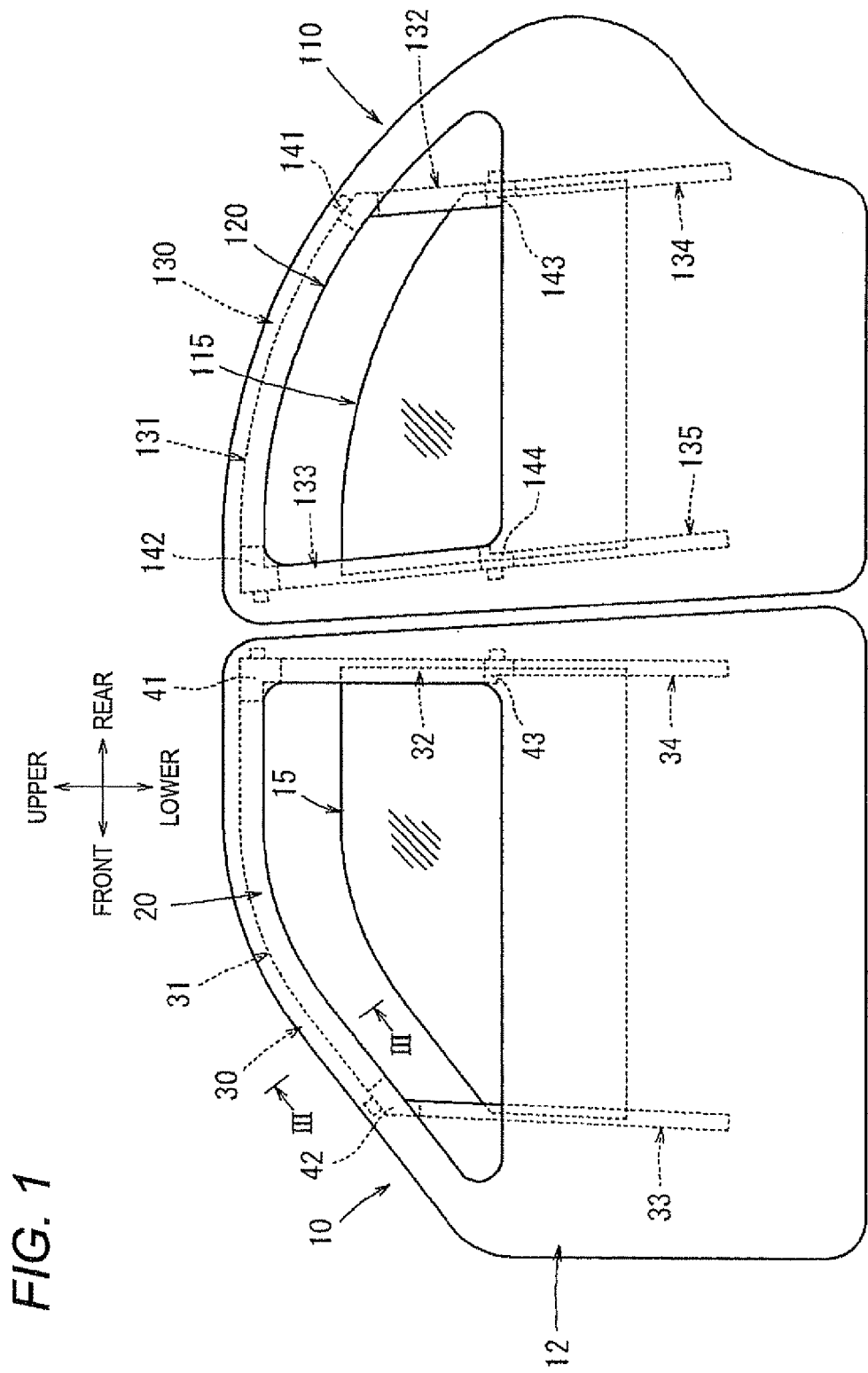
FIG. 1 is a side view schematically illustrating a state in which glass run channel assemblies, which use glass run channels according to a first exemplary embodiment of the invention, are provided at a window frame of a front door and a window frame of a rear door respectively.

As shown in FIG. 1, a window frame 20 is integrally formed at a door panel 12 that forms a front door 10 as a vehicle door.

A run mounting portion 25 is formed at the window frame 20. The run mounting portion 25 is formed by an outer panel 13 and an inner panel 14 which constitute the door panel 12 in a step shape which an opening side is narrow and an inner side is wide (see FIG. 3).

Figure 2:
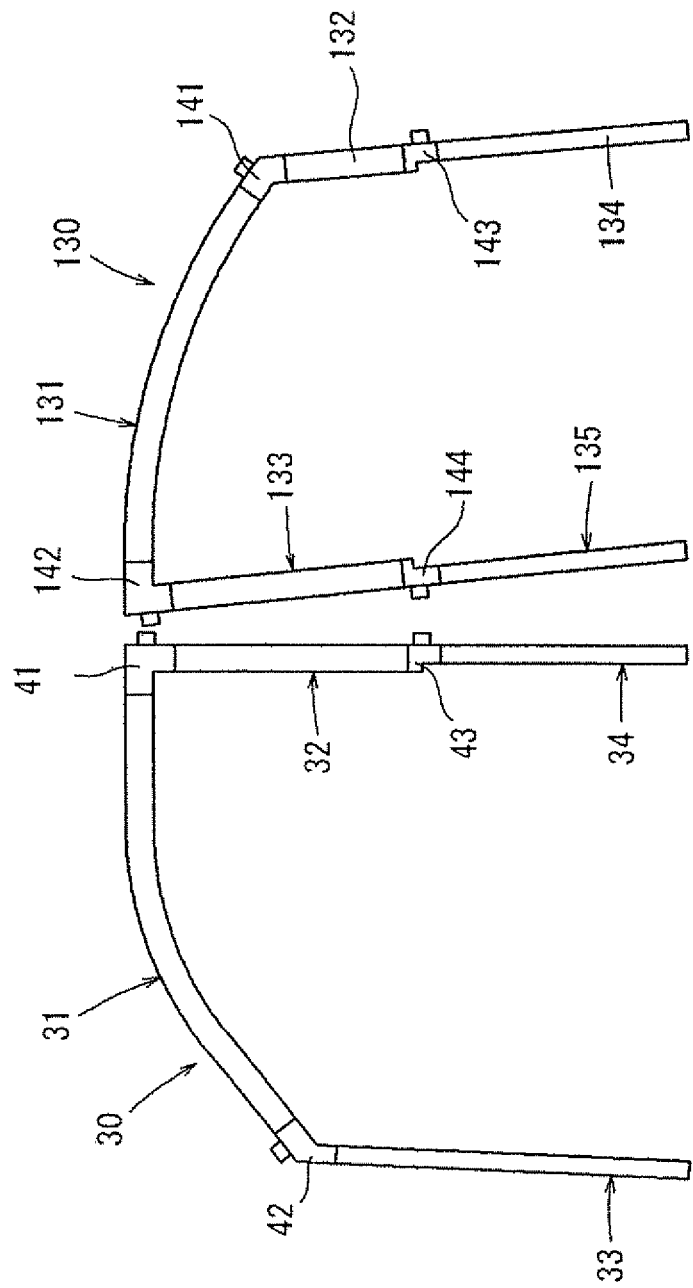
FIG. 2 is a side view illustrating the glass run channel assembly.

As shown in FIGS. 1 and 2, a front side glass run channel assembly 30 is mounted on the window frame 20 of the front door 10 as the vehicle door so as to guide a moving up and down operation of a windowpane 15. The front side glass run channel assembly 30 has an elongated shape and is made of polymer material (thermoplastic elastomer material). The glass run channel assembly 30 has first to fourth glass run channels 31, 32, 33 and 34 which are formed in elongated shapes by extrusion molding, and first to third connecting bodies 41, 42 and 43 which are formed by injection molding.

The first glass run channel 31 is mounted along an upper side portion and a front oblique side portion of the front door 10.

An upper end of the second glass run channel 32 is connected to a rear end of the first glass run channel 31 by the first connecting body (the corner connecting body) 41. The second glass run channel 32 is mounted along a rear vertical side portion of the front door 10.

An upper end of the third glass run channel 33 is connected to a front end of the first glass run channel 31 by the second connecting body (a corner connecting body) 42. The third glass run channel 33 is mounted along the front vertical frame portion which extends from a rear edge of a front quarter window of the front door 10 to the inside of the door.

A lower end of the second glass run channel 32 is arranged within the door and an upper end of the fourth glass run channel 34 is connected to the lower end of the second glass run channel 32 by the third connecting body 43. The fourth glass run channel 34 is mounted along the rear vertical frame portion within the door.

Figure 3:
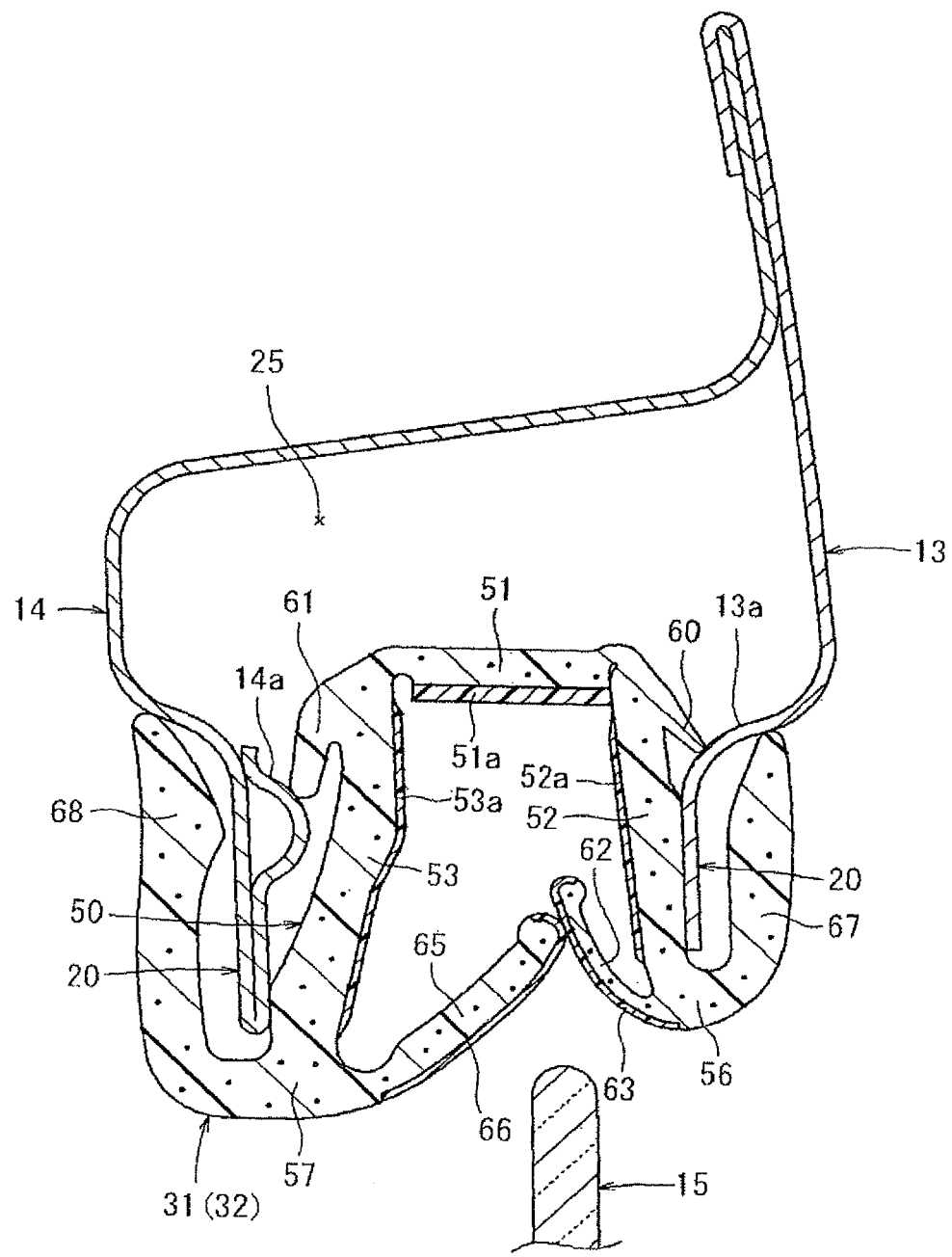
FIG. 3 is a cross-sectional view taken along line III-III in FIG. 1, illustrating the glass run channel.

Among the first to the fourth glass run channels 31 to 34 which constitute the front side glass run channel assembly 30, the first glass run channel 31 is constituted by an extrusion molding product having a cross-sectional shape as shown in FIG. 3.

A run channel main body 50 that forms a main part of the first glass run channel 31 includes a base bottom portion 51 that is provided at a position that faces an end surface of the windowpane 15, an exterior side wall portion 52 which extends from a width end of the base bottom portion and an interior side wall portion 53 which extends from another width end of the base bottom portion 51. The exterior side wall portion 52 and the interior side wall portion 53 constitute a sliding recess in which a peripheral portion of the windowpane 15 can be inserted. Further, the run channel main body 50 may include an exterior seal lip 62, an interior seal lip 65, or both. The exterior seal lip 62 projects toward the base bottom portion 51 from a top connecting portion 56 which is an opening side end of the exterior side wall portion 52. The interior seal lip 65 projects toward the base bottom portion 51 from a top connecting portion 57 which is an opening side end of the interior side wall portion 53. The exterior seal lip 62 and the interior seal lip 65 is configured to elastically contact each surfaces of the windowpane 15 respectively.

Further, the run channel main body 50 may include an exterior decoration portion 67, an interior decoration portion 68, or both. The exterior decoration portion 67 projects from the top connecting portion 56 and the interior decoration portion 68 projects from the top connecting portion 57. The exterior decoration portion 67 projects toward an opposite side of the exterior seal lip 62 and is formed in a folded shape along the exterior side wall portion 52. The interior decoration portion 68 projects toward an opposite side of the interior seal lip 65, and is formed in a folded shape along the interior side wall portion 53.

The run channel main body 50 may include an exterior holding lip 60 having a lip shape, an interior holding lip 61 having a lip shape, or both. The exterior holding lip 60 is provided outside of an end portion of the exterior side wall portion 52 at the base bottom portion 51 side. The interior holding lip 61 is provided outside of an end portion of the interior side wall portion 53 at the base bottom portion 51 side. The exterior holding lip 60 and the interior holding lip 61 are inclined and projected from the exterior side wall portion 52 and the interior side wall portion 53 respectively. Further, the exterior holding lip 60 is elastically engaged and retained to an exterior step portion 13a of the window frame 20. The interior holding lip 61 is elastically engaged and retained to an interior step portion 14a of the window frame 20.

In the first exemplary embodiment, an exterior low friction layer 63 is formed at a surface of the exterior seal lip 62, which contacts the windowpane 15, and an interior low friction layer 66 is formed at a surface of the interior seal lip 65, which contacts the windowpane 15. The low friction layers 63 and 66 are formed by a co-extrusion (two-color molding) with the extrusion molding of the run channel main body 50, by using a material, which is the same kind of material as a material of the run channel main body 50 or a material which is miscible with the material of the run channel main body 50, and which is a low friction material (the thermoplastic elastomer material or the thermoplastic resin material), that is, a coefficient of kinetic friction of the material is smaller than that of the material of the run channel main body 50.

Further, low friction layers 52a, 53a and 51a are made of a low friction material that has a coefficient of kinetic friction smaller than that of the material of the run channel main body 50. The low friction layers 52a, 53a and 51a are respectively formed on surfaces of the both side wall portions 52 and 53 that face each other and a bottom surface of the base bottom portion 51. The low friction layers 52a, 53a and 51a are formed by co-extrusion (two-color molding) simultaneously with the extrusion molding of the run channel main body 50.

The run channel main body 50 has a foamed part that is made of a foamable polymer material that includes a thermoplastic elastomer material and thermal expansion capsules, and has countless foaming cells which are formed by the expansion of the thermal expansion capsules. The water absorption rate of the foamed part of the run channel main body 50 is adjusted to be 5% or less.

It is preferred that the water absorption rate of the foamed part of the run channel main body 50 is 1% or less.

Additionally, it is preferred that a specific gravity of the foamed part of the run channel main body 50 is 0.50 to 0.75. It is further preferred that the specific gravity of the foamed part of the run channel main body 50 is 0.65.

The water absorption rate of the foamed part of the run channel main body 50 is measured by a method described hereinafter.

(1) First, a glass run channel (the first to the fourth glass run channels 31 to 34) in which the run channel main body 50 as a main body is cut to a length of 50 mm, so as to form a measuring piece.

(2) The weight of the measuring piece (W0) is measured.

(3) The measuring piece is deposited in a container that is filled with water. At this time, the measuring piece is dipped into the water so that a position of an upper end of the measuring piece is at a depth of 50 mm or more from a water surface of the container and a position of the lower end of the measuring piece is separated by 30 mm to 50 mm from the bottom surface of the container.

(4) The entire container in which the measuring piece is dipped is depressurized to 17 kPa (127.5 mmHg) for 5 minutes and then left at an atmospheric pressure for 3 minutes.

(5) The measuring piece is taken out from the container, water droplets that attached the surface of the measuring piece are removed and then the weight (W1) of the measuring piece after dipping is measured.

(6) After that, a weight change rate ($\Delta m$) of the measuring piece is calculated based on the formula of $\Delta m = [(W1-W0)/W0] \times 100$.

(7) The above described processes (1) to (6) is performed with respect to a plurality (three or more) of measuring pieces and the average of the value of $\Delta m$s is calculated. The average of the value of $\Delta m$s is the water absorption rate of the foamed part of the run channel main body 50.

As described previously, in the foamable polymer material that forms the foamed part of the run channel main body 50, 0.5 to 2.0 parts by weight of the thermal expansion capsules are mixed with 100 parts by weight of the thermoplastic elastomer material so that the water absorption rate of the foamed part of the run channel main body 50 is 5% or less and the specific gravity of the foamed part of the run channel main body 50 is 0.50 to 0.75.

It is further preferred that, in the foamable polymer material that forms the foamed part of the run channel main body 50, 1.0 part by weight of the thermal expansion capsules are mixed with respect to 100 parts by weight of the thermoplastic elastomer material so that the water absorption rate of the foamed part of the run channel main body 50 is 1% or less and the specific gravity of the foamed part of the run channel main body 50 is 0.65.

It is preferred that the foamed part of the run channel main body 50 is formed such that the inner foaming cells inside thereof are closed cells that do not communicate with external air. It is further preferred that the foaming cells are closed cells that do not communicate with each other inside the run channel main body 50.

A run channel main body that forms the main part of the second, the third and the fourth glass run channels 32, 33 and 34, among the first to fourth glass run channels 31 to 34 which constitute the front side glass run channel assembly 30, is constituted in the same manner as the run channel main body 50 that constitutes the main part of the first glass run channel 31 except that the cross-sectional shape thereof is different.

That is, the foamed part of the run channel main body that forms the main part of the second, the third and the fourth glass run channels 32, 33 and 34 are also made of the foamable polymer material that includes the thermoplastic elastomer material and the thermal expansion capsule, and have countless foaming cells which are formed by the expansion of the thermal expansion capsules.

Among the first to fourth glass run channels 31 to 34, two or more glass run channels may have the same cross-sectional shape. For example, the second glass run channel 32 and the third glass run channel 33 may have the same cross-sectional shape.

The glass run channel according to the first exemplary embodiment of the invention is configured as described above.

Accordingly, since the foamed part of the run channel main body 50 that forms the main part of the first to the fourth glass run channels 31 to 34 that constitute the front side glass run channel assembly 30 is made of the foamable polymer material that includes the thermoplastic elastomer material and the thermal expansion capsule, the run channel main body 50 can be reduced in weight compared to the glass run channel made of rubber.

Further, the water absorption rate of the foamed part of the run channel main body 50 is adjusted to 5% or less so that water is not easily absorbed within the foaming cells.

As a result, in the manufacturing process of the glass run channel, since only a little amount of water is absorbed within the glass run channel (the first to the fourth glass run channels 31 to 34 which constitute the front side glass run channel assembly 30), the little amount of water is not required to be vaporized and dried after the glass run channel is cooled and solidified by the cooling water so that the drying process time can be shortened or the drying process can be cancelled.

Further, the run channel main body 50 is prevented from absorbing water even in a state in which the front side glass run channel assembly 30 is mounted and used at the run mounting portion of the window frame 20 of the front door 10. Thus, even when outdoor temperature is a low temperature, the run channel main body 50 is not excessively hardened due to the water within the run channel main body 50 being frozen, and the problem of the generation of abnormal noise when the windowpane is moved up and down is prevented.

Further, by adjusting the water absorption rate of the foamed part of the run channel main body 50 to 1% or less, the water is even less easily absorbed within the foam cells.

It is preferred that the specific gravity of the foamed part of the run channel main body 50 is 0.50 to 0.75.

That is, if the specific gravity of the foamed part of the run channel main body 50 is less than 0.50, the water absorption rate may increase.

Further, if the specific gravity of the foamed part of the run channel main body 50 is more than 0.75, the weight reduction effect will decrease.

It is further preferred that the foamed part of the specific gravity of the run channel main body 50 is 0.65.

In the foamable polymer material that forms the foamed part of the run channel main body 50, 0.5 to 2.0 parts by weight of the thermal expansion capsules are mixed with 100 parts by weight of the thermoplastic elastomer material. Thus, the weight reduction is satisfactorily performed and the water absorption rate can be maintained to be 5% or less.

In other words, if the thermal expansion capsules are less than 0.5 parts by weight, the weight reduction effect will decrease.

If the thermal expansion capsules are more than 2.0 parts by weight, the capsules may become an excessively foamed state so that rigidity, tensile strength and the like decrease, or the foaming cells may become continuous to each other so that it is difficult to maintain the water absorption rate at 5% or less.

Further, in the foamable polymer material that forms the foamed part of the run channel main body 50, if 1.0 part by weight of the thermal expansion capsules is mixed with respect to 100 parts by weight of the thermoplastic elastomer material, the weight reduction effect and the suppression effect on the water absorption rate further increases.

Meanwhile, the specific gravity or the water absorption rate of the foamed part of the run channel main body 50 can be adjusted by other conditions than the mixing amount of the thermal expansion capsules. Specifically, a foaming state of the thermal expansion capsules can be adjusted by temperature or the rotation speed of a screw of the extrusion molding machine when the glass run channel is extrusion molded.

The foamed part of the run channel main body 50 is formed such that the foaming cells inside thereof are closed cells that do not communicate with the external air. Accordingly, the water is satisfactorily prevented from being absorbed inside the run channel main body 50 from the surface of the run channel main body and the suppression effect on the water absorption rate increases.

The foamed part of the run channel main body 50 is formed such that the foaming cells inside thereof are closed cells that do not communicate with each other. Accordingly, the suppression effect on the water absorption rate is increased. For example, even if portions of the foaming cells inside the foamed part of the run channel main body 50 are exposed to the surface, such as the cut end surfaces of the run channel main body 50, water is satisfactorily prevented from being absorbed inside the foamed part of the run channel main body 50 from the exposed foaming cells.

Hereinafter, a method for manufacturing the first to the fourth glass run channels 31 to 34, which configures the front side glass run channel assembly 30 including the run channel main body 50, will be described.

First of all, a thermoplastic elastomer material and a masterbatch material are prepared. The thermoplastic elastomer material is a main component of the foamed part of the run channel main body 50. The masterbatch material is made by mixing the thermal expansion capsules with a thermoplastic resin material that is the same kind of material as the thermoplastic elastomer material or a material which is miscible with the thermoplastic elastomer material.

As the thermoplastic elastomer material that is a main component of the foamed part of the run channel main body 50, for example, a material is made by mixing EPDM (ethylene propylene diene copolymer) and PP (polypropylene), and then mixing additives such as a plasticizer or colorant thereto.

As the masterbatch material, a material is used in which the thereto expandable capsules (trade name of ADVANCELL, manufactured by SEKISUI CHEMICAL CO., LTD., average particle diameter: 22 µm to 32 µm, expansion start temperature: 160 degrees Celsius to 180 degrees Celsius, all from a catalogue) and PE (polyethylene) are mixed in a ratio of 1:1 in the weight ratio and made into a pellet.

The thermoplastic elastomer material in which the thermal expansion capsules are mixed is not limited to the above-described material. For example, although the above-described thermoplastic elastomer is a crosslinkable material, a noncrosslinkable thermoplastic elastomer material may be used.

It is preferred that the thermoplastic elastomer material has a JISA hardness of 70 to 90 degrees.

The pellets of the thermoplastic elastomer material and the pellets of the masterbatch material are put into a hopper of the extrusion molding machine. Here, the pellets of the thermoplastic elastomer material and the pellets of the masterbatch material are put into the hopper after being measured in weight and mixed in an adjusted weight ratio, which are set in advance. After that, the mixed material is sequentially transferred within a cylinder from the hopper by a screw that is rotated within the cylinder of the extrusion molding machine.

In the first exemplary embodiment, 1.0 to 4.0 parts by weight of the masterbatch material (0.5 to 2.0 parts by weight of the thermal expansion microcapsules) are mixed to 100 parts by weight of the thermoplastic elastomer material.

It is preferred that 2.0 parts by weight of the masterbatch material (1.0 part by weight of the thermal expansion microcapsules) are mixed to 100 parts by weight of the thermoplastic elastomer material.

The mixed material of thermoplastic elastomer material and the masterbatch material is heated and pressurized while being mixed in the extrusion molding machine so that it becomes a foamable polymer material in a molten state. Thus, the foamable polymer material in the molten state is supplied to a first material flow passage that has a shape corresponding to the run channel main body 50 within a mold which is connected to the outlet of the cylinder of the extrusion molding machine.

Meanwhile, the low friction material for forming the low friction layers 52*a*, 53*a*, 51*a*, 63 and 66, the coefficient of kinetic friction of which is smaller than that of the foamable polymer material, is put into another extrusion molding machine (cylinder) from a hopper that is different from the above described hopper via a measurer and is supplied to the second material flow passage that corresponds to the low friction layers 52*a*, 53*a*, 51*a*, 63 and 66 within the mold while being heated, pressurized and melted.

The first and second material flow passages of the mold are joined together in the mold. And the melted material of the first and second material flow passages is extruded at the same time from the extrusion outlet which is formed at an end (downmost stream side) of the mold. The temperature near a material inlet of the extrusion molding machine is set to, for example, about 120 degrees Celsius to 150 degrees Celsius (a temperature at which the thermal expansion capsules do not break). The temperature is gradually increased from the material inlet toward the mold, and the temperature near the extrusion outlet of the mold is set to about 210 degrees Celsius.

Just after the foamable polymer material and the thermoplastic elastomer material as the low friction material having a small coefficient of kinetic friction are extruded from the extrusion outlet of the mold, the pressure that is applied to the materials is released so that the thermal expansion capsules (microcapsules) in the foamable polymer material are expanded and foamed. An intermediate molding body, which has the cross-sectional shape of the run channel main body 50 and the glass run channels (the first to the fourth glass run channels 31 to 34) having the low friction layers 52*a*, 53*a*, 51*a*, 63 and 66, is formed thereby.

After the thermal expansion capsules (the microcapsules) are foamed, the intermediate molding body is cooled, solidified and cut in a predetermined length, thereby manufacturing the glass run channels (the first to the fourth glass run channels 31 to 34).

Accordingly, the first to the fourth glass run channels 31 to 34 that are attachable to the front door 10 are easily manufactured by the above-described manufacturing method.

After the first to the fourth glass run channels 31 to 34 are formed by the extrusion molding, the end surfaces of the first to the fourth glass run channels 31 to 34 that face each other are connected integrally through the first to the third connecting bodies 41, 42 and 43 that are formed by the injection molding, thereby manufacturing the front side glass run channel assembly 30.

A rear side glass run channel assembly 130 that is attachable to a rear door 110 can be also manufactured in the same manner as in the above described manufacturing method.

As shown in FIGS. 1 and 2, a part of the rear side glass run channel assembly 130 is formed in the elongated shape by the polymer material (the thermoplastic elastomer material) so as to be mounted on the window frame 120 of the rear door 110 as the vehicle door and guide the moving up and down of the windowpane 115. The rear side glass run channel assembly 130 has the first to fifth glass run channels 131, 132, 133, 134 and 135 that are formed in the elongated shape by the extrusion molding, and the first to fourth connecting bodies 141, 142, 143 and 144 that are formed by the injection molding.

The first glass run channel 131 is formed in the same structure as that of the first glass run channel 31 of the front side glass run channel assembly 30 (see FIG. 3).

Further, the run channel main body that forms the main part of the second to fifth glass run channels 132 to 135 that constitute the rear side glass run channel assembly 130 is constituted in the same manner as the run channel main body that constitutes the main part of the first glass run channel 131 except that the cross-sectional shape thereof is different.

Example 1

The water absorption rate and the specific gravity of the foamable polymer that forms the foamed part of the run channel main body according to the first exemplary embodiment are measured.

As the thermoplastic elastomer material, an olefin-system thermoplastic elastomer having a ESA hardness of 80 degrees is used.

As the thermal expansion capsules (the microcapsules), "ADVANCELL", manufactured by SEKISUI CHEMICAL CO., LTD., is used.

1 to 3 parts by weight of the thermal expansion capsules are mixed with 100 parts by weight of the thermoplastic elastomer.

When the thermal expansion capsules are mixed, the masterbatch, in which the thermal expansion capsules are dispersed beforehand into the same amount of polyethylene, is used.

Specific molding conditions of the extrusion molding are as follows.

Temperatures (the temperatures in four positions from the upstream side toward the downstream side) of each of the portions of the cylinder: 150 degrees Celsius, 170 degrees Celsius, 175 degrees Celsius and 180 degrees Celsius.

Temperature of the cylinder head: 200 degrees Celsius.

Temperature of the outlet: 200 degrees Celsius.

Rotation speed of the screw: 10 rpm, 30 rpm and 60 rpm.

The above described conditions are combined as shown in Table 1, and samples No. 1 to No. 6 are formed. Sample No. 7 is a sample in which the thermal expansion capsules are not mixed.

The water absorption rate is obtained by measuring the water absorption rate of a plurality (N=5 to 8) of measuring pieces and calculating the average value of the water absorption rates, according to the above described method.

The specific gravity is measured using an electronic densimeter MD-200S manufactured by ALFA MIRAGE CO., LTD.

Figure 5:
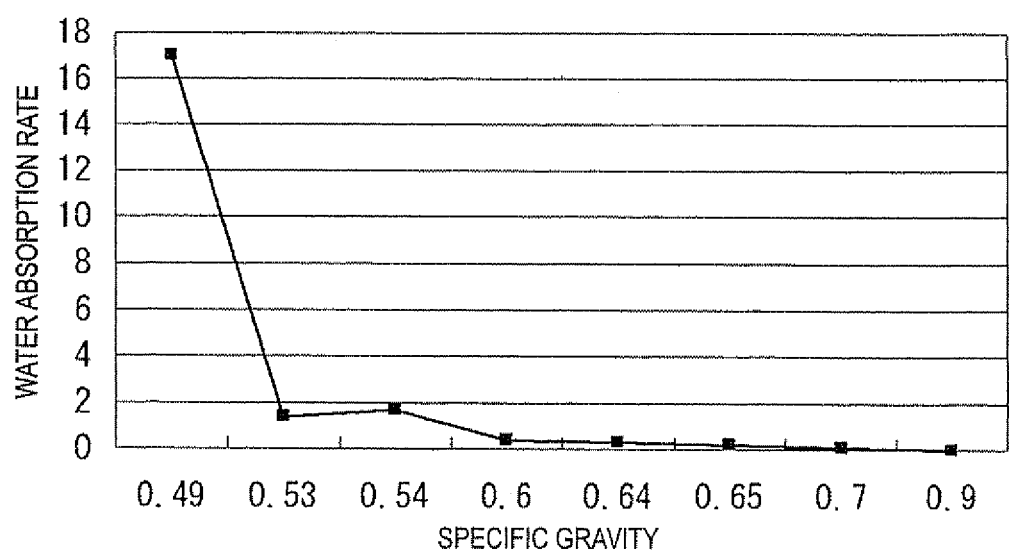
FIG. 5 is an explanation view illustrating a relationship between a water absorption rate and a specific gravity of a foamable polymer which forms a foaming part of a run channel main body.

The relation of the water absorption rate and the specific gravity that are measured by the above-described method are illustrated in the explanation drawing (graph) of FIG. 5 and Table 1.

TABLE 1

| Sample No. | Mixed amount of the capsules [parts by weight] Capsules | Rotation speed of screw | Specific gravity | Water absorption rate [%] | Suitable or not |
| --- | --- | --- | --- | --- | --- |
| 1 | 3 | 60 | 0.49 | 17.00 | Not Suitable |
| 2 | 2 | 60 | 0.53 | 1.40 | Suitable |
| 3 | 1.5 | 60 | 0.60 | 0.40 | Suitable |
| 4 | 1 | 60 | 0.64 | 0.30 | Suitable |

TABLE 1-continued

| Sample No. | Mixed amount of the capsules [parts by weight] Capsules | Rotation speed of screw | Specific gravity | Water absorption rate [%] | Suitable or not |
|---|---|---|---|---|---|
| 5 | 1 | 30 | 0.66 | 0.18 | Suitable |
| 6 | 1 | 10 | 0.70 | 0.12 | Suitable |
| 7 | 0 | 10 | 0.89 | 0.00 | Not Suitable |

Referring to FIG. 5 and Table 1, in a case where the mixed amount of the thermal expansion capsules is 3 parts by weight (sample No. 1), although the specific gravity is less than 0.50, the water absorption rate is exceeds 15%, and the water absorption rate is not 5% or less.

Meanwhile, in a case where the mixed amount of the thermal expansion capsules is 2 parts by weight or less (sample No. 2 to No. 6), the specific gravity is 0.50 or more and the water absorption rate is 2% or less.

Further, in a case where the mixed amount of the thermal expansion capsules is 1.5 or less parts by weight (samples No. 3 to No. 6), the specific gravity is 0.60 or more and the water absorption rate is 1% or less.

In a case where the thermal expansion capsules are not mixed (sample No. 7), since the foaming is not generated by the thermal expansion capsules, the specific gravity is 0.89 and the weight reduction effect can not be obtained.

In samples No. 4 to No. 6, the mixed amount of the thermal expansion capsules is constant so that the specific gravity and the water absorption rate are adjusted by changing the rotation speed of the screw.

If the rotation speed of the screw is increased, there is a tendency that the degree of foaming increases, whereby the specific gravity decreases and the water absorption rate increases.

Meanwhile, if the rotation speed is decreased, there is a tendency that the degree of foaming decreases, whereby the specific gravity increases and the water absorption rate decreases.

While the first exemplary embodiment has been showed and described, the invention is not limited to the first exemplary embodiment, and it will be understood by those skilled in the art that various changes in form and details may be made therein without departing from the spirit and scope of the invention.

Figure 4:
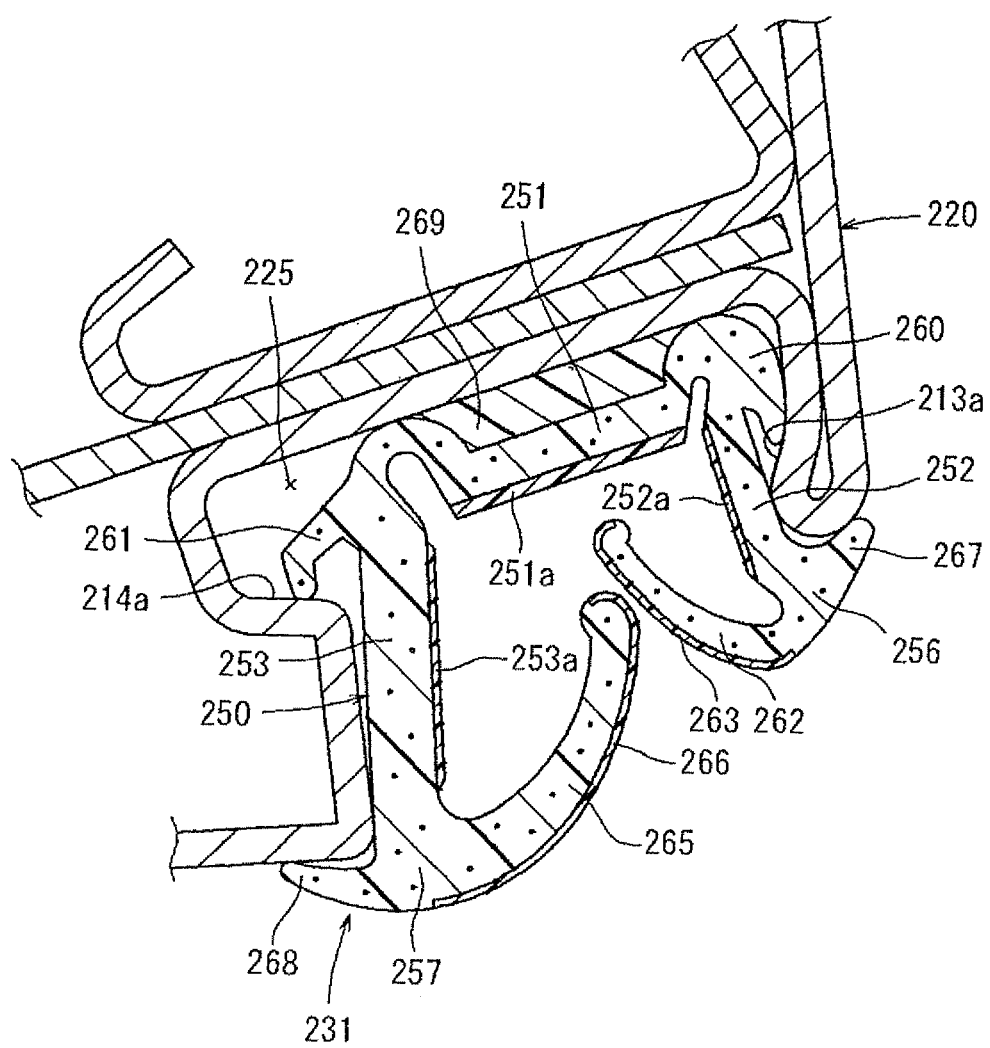
FIG. 4 is a cross-sectional view illustrating the glass run channel according to another exemplary embodiment of the invention.

For example, as shown in FIG. 4, the window frame may be formed by a window frame sash of a sash type. In this case, a window frame sash 220 that constitutes the window frame is formed, which is separated from the door panel of the vehicle opening and closing doors (the front door, the rear door or the like) and is fixed to the door panel. A run mounting recess 225 is formed at the window frame sash 220. A glass run channel 231 has the same configuration as the glass run channel of the first exemplary embodiment except the glass run channel 231 has a cross-section that is mountable to the run mounting recess 225 and has a high friction layer 269 of which the coefficient of static friction is larger than the run channel main body 250. The glass run channel 231 also achieves the same functional effect as the glass run channel of the first exemplary embodiment. FIG. 4 shows an alternative embodiment of the embodiment of FIG. 3, and thus, the remaining reference Item Nos. thereof correspond to those of FIG. 3, except that they include the number "2" in front of the reference Item Nos. of FIG. 3. That is, FIG. 4 shows Item Nos. 213a, 214a, 251, 251a, 252, 252a, 253, 253a, 256, 257, 260, 261, 262, 263, 265, 266, 267 and 268, which correspond to Item Nos. 13a, 14a, 51, 51a, 52, 52a, 53, 53a, 56, 57, 60, 61, 62, 63, 65, 66, 67 and 68, respectively, discussed above in reference to FIG. 3.

The present invention provides illustrative, non-limiting aspects as follows:

(1) According to a first aspect, there is provided a glass run channel having an elongated shape, which is mounted on a run mounting portion of a window frame of a vehicle door, guides moving up and down of a windowpane and is made of a polymer material, the glass run channel comprising: a run channel main body that forms the main part of the glass run channel, the run channel main body including, a base bottom portion which is provided at a position facing an end surface of the windowpane; an interior side wall portion which extends from a width end of the base bottom portion, an exterior side wall portion which extends from another width end of the base bottom portion, an interior seal lip, which projects toward the base bottom portion from an opening side end of the interior side wall portion and elastically contacts a first surface of the windowpane, and an exterior seal lip, which projects toward the base bottom portion from an opening side end of the exterior side wall portion and elastically contacts a second surface of the windowpane, wherein the run channel main body has a foamed part made of a foamable polymer material that includes a thermoplastic elastomer material and thermal expansion capsules, and has foaming cells which are formed by expansion of the thermal expansion capsules, and wherein a water absorption rate of the foamed part of the run channel main body is adjusted to 5% or less.

According to this configuration, since the foamed part of the run channel main body that forms the main part of the glass run channel is made of the foamable polymer material that include the thermoplastic elastomer material and the thermal expansion capsules, the run channel main body can be satisfactorily reduced in weight compared to the glass run channel made of rubber. The water absorption rate of the foamed part of the run channel main body is adjusted to 5% or less so that water is not easily absorbed within the foaming cells. As a result, in the manufacturing process of the glass run channel, since only a little amount of water is absorbed within the glass run channel, the little amount of water is not required to be vaporized and dried after the glass run channel is cooled and solidified by the cooling water so that the drying process time can be shortened or the drying process can be cancelled. Further, the glass run channel can be suppressed from absorbing water even in a using state in which the glass run channel is mounted on the run mounting portion of the window frame of the front door or the rear door. Thus, the defect that, when outdoor temperature is a low temperature, water within the glass run channel is frozen, the glass run channel is excessively hardened and abnormal noise is generated when the windowpane is moved up and down, are prevented.

(2) According to a second aspect, there is provided the glass run channel according to the first aspect, wherein the water absorption rate of the foamed part of the run channel main body is adjusted to 1% or less.

According to this configuration, since the water absorption rate of the foamed part of the run channel main body is adjusted to 1% or less, water is even less easily absorbed within the foaming cells.

(3) According to a third aspect, there is provided the glass run channel according to the first or second aspect, wherein the specific gravity of the foamed part of the run channel main body is 0.50 to 0.75.

According to this configuration, since the specific gravity of the foamed part of the run channel main body is adjusted to 0.50 to 0.75, the weight reduction effect is large. In other words, if the specific gravity of the foamed part of the run channel main body is smaller than 0.50, there is a concern that the water absorption rate will increase. Further, if the specific gravity of the foamed part of the run channel main body is larger than 0.75, the weight reduction effect decreases.

(4) According to a fourth aspect, there is provided the glass run channel according to the first or second aspect, wherein the specific gravity of the foamed part of the run channel main body is 0.65.

According to this configuration, since the specific gravity of the foamed part of the run channel main body is adjusted to 0.65, the weight reduction effect further increases.

(5) According to a fifth aspect, there is provided the glass run channel according to any one of the first to fourth aspect, wherein the foamable polymer material, which forms the foamed part of the run channel main body, includes 100 parts by weight of the thermoplastic elastomer material and 0.5 to 2.0 parts by weight of the thermal expansion capsules.

According to this configuration, the weight reduction is satisfactorily performed and the water absorption rate can be maintained at 5% or less. In other words, if the thermal expansion capsules are less than 0.5 parts by weight, the weight reduction effect decreases. If the thermal expansion capsules are more than 2.0 parts by weight, there are concerns that the capsules will enter an excessively foamed state so that rigidity, tensile strength and the like will decrease, or the foaming cells will be continuous to each other so that it is difficult to maintain the water absorption rate to 5% or less.

(6) According to a sixth aspect, there is provided the glass run channel according to any one of the first to fourth aspect, wherein the foamable polymer material, which forms the foamed part of the run channel main body, includes 100 parts by weight of the thermoplastic elastomer material and 1.0 parts by weight of the thermal expansion capsules.

According to this configuration, the weight reduction effect and the suppression effect on the water absorption increases.

(7) According to a seventh aspect, there is provided the glass run channel according to any one of the first to sixth aspect, wherein the foamed part of the run channel main body is formed such that the foaming cells inside the foamed part of the run channel main body are closed cells that do not communicate with external air.

According to this configuration, fluid can be satisfactorily prevented from being absorbed in the foamed part of the run channel main body from the surface thereof, whereby the effect of the water absorption rate being suppressed can increase.

(8) According to an eighth aspect, there is provided the glass run channel according to the seventh aspect, wherein the foamed part of the run channel main body is formed such that the foaming cells inside the foamed part of the run channel main body are closed cells that do not communicate with each other.

According to this configuration, the effect of the water absorption rate being suppressed can increase, and further, fluid can be satisfactorily prevented from being absorbed from the cut end surface of the run channel main body.

(9) According to a ninth aspect, there is provided a glass run channel assembly including at least two glass run channels according to the first aspect, wherein the at least two glass run channels are joined and constituted in an integrally continuous shape to each other by a connecting body.

According to this configuration, at least two glass run channels are joined in integrally continuous shape by connecting bodies so that the glass run channel assembly having a desired shape and length can be easily obtained. The connecting body is injection-molded between end surfaces of at least two glass run channels that face each other so that each of the end surfaces can also be reliably connected.

(10) According to a tenth aspect, there is provided a method of manufacturing the glass run channel according to the first aspect, the method comprising: inputting a thermoplastic elastomer material and a masterbatch material into a extrusion molding machine in an adjusted weight ratio, wherein the masterbatch material is made by mixing the thermal expansion capsules with the thermoplastic resin material, the thermoplastic resin material being the same material as the thermoplastic elastomer material or being miscible with the thermoplastic elastomer material, providing a foamable polymer material by heating and pressurizing each material while mixing in the extrusion molding machine; supplying the foamable polymer material to a mold: extruding the foamable polymer material from an outlet of the mold of the extrusion molding machine after supplying the foamable polymer material to the mold; forming a molding body of a shape corresponding to a cross-sectional shape of the glass run channel by expanding and foaming the thermal expansion capsules immediately after the extrusion; and cooling and solidifying the molding body after the foaming.

According to this configuration, by using the masterbatch in which the thermal expansion capsules are mixed with the thermoplastic resin material which is the same material as the thermoplastic elastomer material or is miscible with the thermoplastic elastomer material and performing mixing in the extrusion molding machine so as to obtain the foamable polymer material, the thermal expansion capsules are not locally distributed and can be substantially evenly dispersed and mixed in the foamable polymer material. Accordingly, the glass run channel according to the first aspect can be easily manufactured.

(11) According to an eleventh aspect, there is provided a glass run channel having an elongated shape, which is mounted on a run mounting portion of a window frame of a vehicle door, guides moving up and down of a windowpane and is made of a polymer material, the glass run channel comprising: a run channel main body that forms the main part of the glass run channel, the run channel main body including, a base bottom portion which is provided at a position facing an end surface of the windowpane; an interior side wall portion which extends from a width end of the base bottom portion, an exterior side wall portion which extends from another width end of the base bottom portion, an interior seal lip, which projects toward the base bottom portion from an opening side end of the interior side wall portion and elastically contacts a first surface of the windowpane, and an exterior seal lip, which projects toward the base bottom portion from an opening side end of the exterior side wall portion and elastically contacts a second surface of the windowpane, wherein the base bottom portion, the interior side wall portion, the exterior side wall portion and the interior seal lip portion are made of a foamable polymer material that includes a thermoplastic elastomer material and thermal expansion capsules, and has foaming cells which are formed by expansion of the thermal expansion capsules, and wherein each water absorption rate of the base bottom portion, the interior side wall portion, the exterior side wall portion and the interior seal lip portion is adjusted to 5% or less.

What is claimed is:

1. A glass run channel having an elongated shape, which is mounted on a run mounting portion of a window frame of a vehicle door, guides moving up and down of a windowpane and is made of a polymer material, the glass run channel comprising:
    a run channel main body that forms the main part of the glass run channel, the run channel main body including:
        a base bottom portion which is provided at a position facing an end surface of the windowpane, the base bottom portion including a low friction material layer,
        an interior side wall portion which extends from a width end of the base bottom portion, the interior side wall portion including a low friction material layer,
        an exterior side wall portion which extends from another width end of the base bottom portion, the exterior side wall portion including a low friction material layer,
        an interior seal lip, which projects toward the base bottom portion from an opening side end of the interior side wall portion and is configured to elastically contact a first surface of the windowpane, the interior seal lip including a low friction material layer,
        an exterior seal lip, which projects toward the base bottom portion from an opening side end of the exterior side wall portion and is configured to elastically contact a second surface of the windowpane, the exterior seal lip including a low friction material layer,
        an exterior holding lip, which projects away from the base bottom portion from an end portion of the exterior side wall portion at the base bottom portion side and elastically engages or contacts an exterior step portion of an outer panel of the vehicle door, and
        an interior holding lip, which projects away from the base bottom portion from an end portion of the interior side wall portion at the base bottom portion side and elastically engages or contacts an interior step portion of an inner panel of the vehicle door, wherein
    the run channel main body has a foamed part made of a foamable polymer material that includes an olefin system thermoplastic elastomer material and thermal expansion capsules, and has foaming cells which are formed by expansion of the thermal expansion capsules,
    a water absorption rate of the foamed part of the run channel main body is adjusted to 5% or less,
    the specific gravity of the foamed part of the run channel main body is 0.53 to 0.70, and
    the foamable polymer material, which forms the foamed part of the run channel main body, includes 100 parts by weight of the olefin system thermoplastic elastomer material and 0.5 to 2.0 parts by weight of the thermal expansion capsules.

2. The glass run channel according to claim 1, wherein the water absorption rate of the foamed part of the run channel main body is adjusted to 1% or less.

3. The glass run channel according to claim 1, wherein the specific gravity of the foamed part of the run channel main body is 0.65.

4. The glass run channel according to claim 1, wherein the foamable polymer material, which forms the foamed part of the run channel main body, includes 100 parts by weight of the olefin system thermoplastic elastomer material and 1.0 parts by weight of the thermal expansion capsules.

5. The glass run channel according to claim 1, wherein the foamed part of the run channel main body is formed such that the foaming cells inside the foamed part of the run channel main body are closed cells that do not communicate with external air.

6. The glass run channel according to claim 5, wherein the foamed part of the run channel main body is formed such that the foaming cells inside the foamed part of the run channel main body are closed cells that do not communicate with each other.

7. A glass run channel assembly including at least two glass run channels according to claim 1, wherein
    the at least two glass run channels are joined and constituted in an integrally continuous shape to each other by a connecting body.

8. A method of manufacturing the glass run channel according to claim 1, the method comprising:
    inputting the olefin system thermoplastic elastomer material and a masterbatch material into an extrusion molding machine in an adjusted weight ratio, wherein the masterbatch material is made by mixing the thermal expansion capsules with a thermoplastic resin material, the thermoplastic resin material being the same material as the olefin system thermoplastic elastomer material or being miscible with the olefin system thermoplastic elastomer material,
    providing a foamable polymer material by heating and pressurizing each material while mixing in the extrusion molding machine;
    supplying the foamable polymer material to a mold;
    extruding the foamable polymer material from an outlet of the mold of the extrusion molding machine after supplying the foamable polymer material to the mold;
    forming a molding body of a shape corresponding to a cross-sectional shape of the glass run channel by expanding and foaming the thermal expansion capsules immediately after the extrusion; and
    cooling and solidifying the molding body after the foaming.

9. A glass run channel having an elongated shape, which is mounted on a run mounting portion of a window frame of a vehicle door, guides moving up and down of a windowpane and is made of a polymer material, the glass run channel comprising:
    a run channel main body that forms the main part of the glass run channel, the run channel main body including:
        a base bottom portion which is provided at a position facing an end surface of the windowpane, the base bottom portion including a low friction material layer,
        an interior side wall portion which extends from a width end of the base bottom portion, the interior side wall portion including a low friction material layer,
        an exterior side wall portion which extends from another width end of the base bottom portion, the exterior side wall portion including a low friction material layer, an interior seal lip, which projects toward the base bottom portion from an opening side end of the interior side wall portion and is configured to elastically contact a first surface of the windowpane, the interior seal lip including a low friction material layer, an exterior seal lip, which projects toward the base bottom portion from an opening side end of the exterior side wall portion and is configured to elastically contact a second surface of the windowpane, the exterior seal lip including a low friction material layer, an exterior holding lip, which projects away from the base bottom portion from an end portion of the exterior side wall portion at the base bottom portion side and elastically engages or contacts an interior step portion of an outer panel of the vehicle door, and an interior holding lip, which projects away from the base bottom portion from an end portion of the interior side wall portion at the base bottom portion side and elastically engages or contacts an interior step portion of an inner panel of the vehicle door, wherein the base bottom portion, the interior side wall portion, the exterior side wall portion and the interior seal lip are made of a foamable polymer material that includes an olefin system thermoplastic elastomer material and thermal expansion capsules, and has foaming cells which are formed by expansion of the thermal expansion capsules, each water absorption rate of the base bottom portion, the interior side wall portion, the exterior side wall portion and the interior seal lip is adjusted to 5% or less, the specific gravity of the foamed part of the run channel main body is 0.53 to 0.70, and the foamable polymer material, which forms the foamed part of the run channel main body, includes 100 parts by weight of the olefin system thermoplastic elastomer material and 0.5 to 2.0 parts by weight of the thermal expansion capsules.

10. The glass run channel according to claim 1, wherein the foamable polymer material includes 1.0 to 2.0 parts by weight of the thermal expansion capsules.

11. The glass run channel according to claim 9, wherein the foamable polymer material includes 1.0 to 2.0 parts by weight of the thermal expansion capsules.

12. The glass run channel according to claim 1, wherein the specific gravity of the foamed part of the run channel main body is 0.60 to 0.70.

13. The glass run channel according to claim 9, wherein the specific gravity of the foamed part of the run channel main body is 0.60 to 0.70.

14. The glass run channel according to claim 1, wherein a rotation speed of a screw, which mixes the olefin system thermoplastic elastomer material and the thermal expansion capsules, is between 10 to 60 rpm.

15. The glass run channel according to claim 9, wherein a rotation speed of a screw, which mixes the olefin system thermoplastic elastomer material and the thermal expansion capsules, is between 10 to 60 rpm.

16. The glass run channel according to claim 1, wherein the run channel main body further includes at least one of:

an interior decoration portion that projects toward an opposite side of the interior seal lip from the interior side wall portion, and that elastically engages or contacts the inner panel of the vehicle door; and an exterior decoration portion that projects toward an opposite side of the exterior seal lip from the exterior side wall portion, and that elastically engages or contacts the outer panel of the vehicle door.

17. The glass run channel according to claim 9, wherein the run channel main body further includes at least one of:

an interior decoration portion that projects toward an opposite side of the interior seal lip from the interior side wall portion, and that elastically engages or contacts the inner panel of the vehicle door; and an exterior decoration portion that projects toward an opposite side of the exterior seal lip from the exterior side wall portion, and that elastically engages or contacts the outer panel of the vehicle door.

18. A glass run channel having an elongated shape, which is mounted on a run mounting portion of a window frame of a vehicle door, guides moving up and down of a windowpane and is made of a polymer material, the glass run channel comprising:

a run channel main body that forms the main part of the glass run channel, the run channel main body including:

a base bottom portion which is provided at a position facing an end surface of the windowpane, the base bottom portion including a low friction material layer, an interior side wall portion which extends from a width end of the base bottom portion, the interior side wall portion including a low friction material layer, an exterior side wall portion which extends from another width end of the base bottom portion, the exterior side wall portion including a low friction material layer, an interior seal lip, which projects toward the base bottom portion from an opening side end of the interior side wall portion and is configured to elastically contact a first surface of the windowpane, the interior seal lip including a low friction material layer, an exterior seal lip, which projects toward the base bottom portion from an opening side end of the exterior side wall portion and is configured to elastically contact a second surface of the windowpane, the exterior seal lip including a low friction material layer, an exterior holding lip, which projects away from the base bottom portion from an end portion of the exterior side wall portion at the base bottom portion side and elastically engages or contacts an interior step portion of an outer panel of the vehicle door, and an interior holding lip, which projects away from the base bottom portion from an end portion of the interior side wall portion at the base bottom portion side and elastically engages or contacts an interior step portion of an inner panel of the vehicle door, wherein the base bottom portion, the interior side wall portion, the exterior side wall portion and the interior seal lip are made of a foamable polymer material that includes an olefin system thermoplastic elastomer material and thermal expansion capsules, and has foaming cells which are formed by expansion of the thermal expansion capsules, each water absorption rate of the base bottom portion, the interior side wall portion, the exterior side wall portion and the interior seal lip is adjusted to 5% or less, the specific gravity of the foamed part of the run channel main body is 0.50 to 0.75, and the foamable polymer material, which forms the foamed part of the run channel main body, includes 100 parts by weight of the olefin system thermoplastic elastomer material and 0.5 to 2.0 parts by weight of the thermal expansion capsules.

* * * * *